Figure 4:
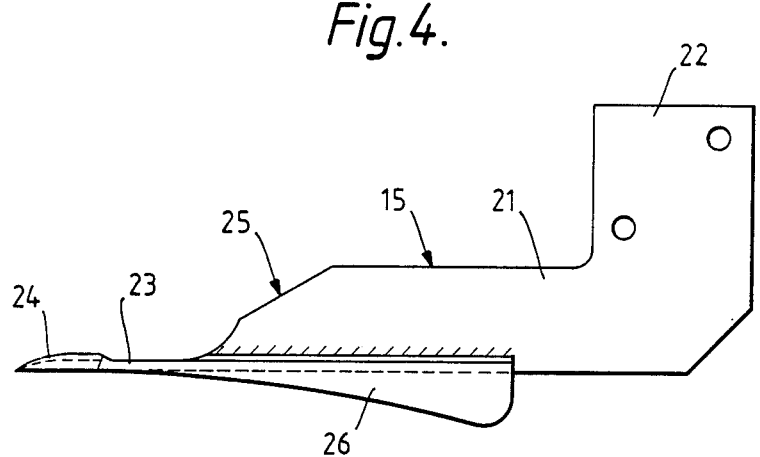

United States Patent [19]

Perkins

[11] Patent Number: 4,779,498
[45] Date of Patent: Oct. 25, 1988

[54] DEVICE FOR CUTTING REINFORCED ELASTOMERIC PLIES

[75] Inventor: David J. B. Perkins, Woolton, United Kingdom

[73] Assignee: Apsley Metals Limited, United Kingdom

[21] Appl. No.: 116,286

[22] Filed: Nov. 2, 1987

[30] Foreign Application Priority Data

Nov. 1, 1986 [GB] United Kingdom ............... 8626160

[51] Int. Cl.[4] ........................... B29H 9/02; B26D 3/28
[52] U.S. Cl. ............................................. 83/18; 83/23; 83/56; 83/175; 83/54; 83/924
[58] Field of Search ................. 83/56, 54, 614, 178, 83/175, 18, 924, 13, 23

[56] References Cited

U.S. PATENT DOCUMENTS

| | | | |
|---|---|---|---|
| 1,838,011 | 12/1931 | Peter | 83/924 X |
| 3,654,828 | 4/1972 | Leblond et al. | 83/23 |
| 4,158,417 | 6/1979 | Inoue | 83/54 X |
| 4,608,890 | 9/1986 | Still et al. | 83/56 X |

*Primary Examiner*—Donald R. Schran
*Attorney, Agent, or Firm*—Stevens, Davis, Miller & Mosher

[57] ABSTRACT

A cutting device for slitting a textile material, particularly a textile reinforced elastomeric ply lying on a curved surface (11). The device comprises a guide means (14) and a carriage (13) mounted thereon at a fixed height from the curved surface (11). A serrated rotary knife (12) is mounted on the carriage together with a plough means (15) which lifts the ply (12) off the curved surface (11) permitting the knife to cut the textile material without contacting the surface, and also for raising one of the cut edges off the curved surface.

7 Claims, 3 Drawing Sheets

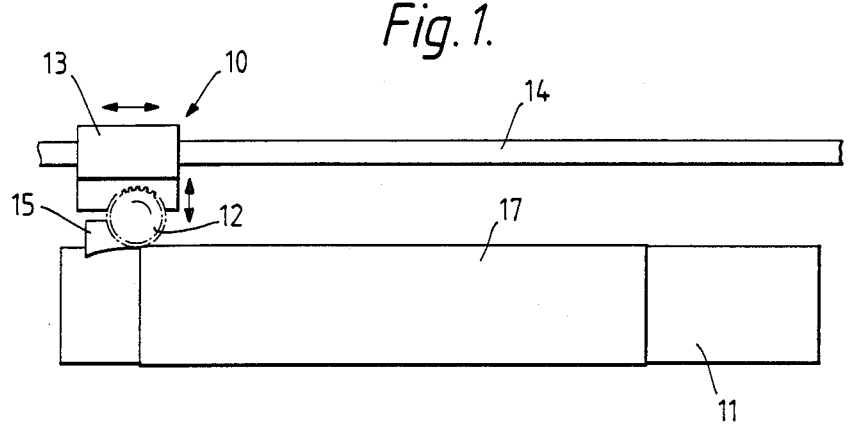
Fig. 1.
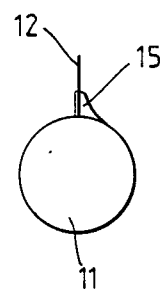
Fig. 2.
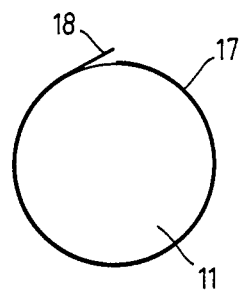 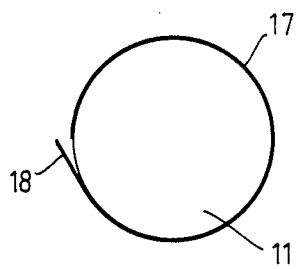
Fig. 3A.  Fig. 3B.

DEVICE FOR CUTTING REINFORCED ELASTOMERIC PLIES

The invention relates to a device for cutting cord reinforced elastomeric plies and in particular to the cutting of parallel cord reinforced plies.

It is known to manufacture reinforced elastomeric plies by placing a layer of elastomer onto the cylindrical surface of a mandrel, and then winding a single cord or filament helically around the mandrel onto the elastomeric layer so that the windings of the cord around the mandrel are substantially parallel to each other. A second elastomeric layer may then be applied over the cords if required. The elastomeric reinforced ply is then cut longitudinally of the mandrel to produce a flat finished ply reinforced by substantially parallel cords and which is suitable for use in the manufacture of a radial carcass pneumatic tire.

The present invention relates to a device suitable for longitudinally cutting of the textile material reinforced ply after it is formed on the mandrel, without causing damage to the mandrel.

Accordingly there is provided a cutting device for slitting a textile material lying on a curved surface, the cutting device being characterized by:
(a) a guide means and a carriage movable thereon, the carriage being movable along the guide means at a substantially fixed height from the curved surface along which the slit is to be made;
(b) a serrated rotary knife mounted on the carriage; and
(c) plough means, mounted on the carriage, for lifting the textile material off of the curved surface, for permitting the knife to cut the textile material without contacting such surface, and for raising one of the cut edges of the textile material off such curved surface.

Preferably the textile material is in the form of a textile cord reinforced elastomeric ply and the curved surface is the outer surface of a mandrel on which the ply is formed. Also there is provided a method of manufacture of a pneumatic tire including the step of longitudinally slitting a carcass ply reinforced by a textile material, by means of a cutting device as described above.

Figure 5:
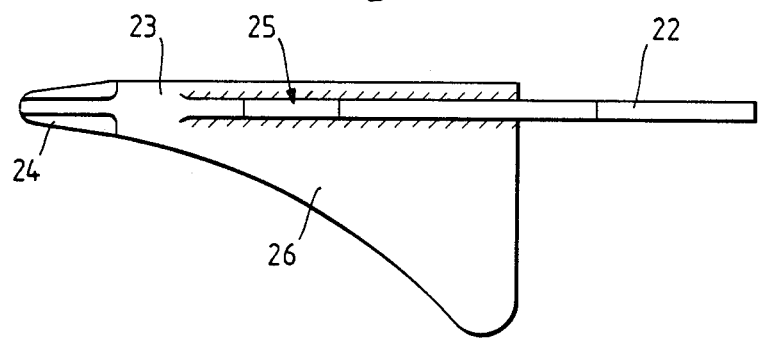
Figure 6:
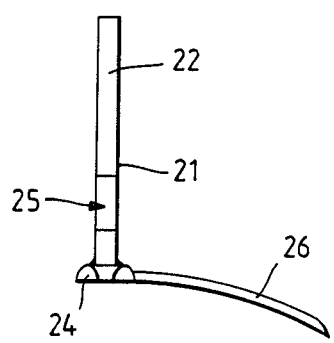
Figures 7, 8:
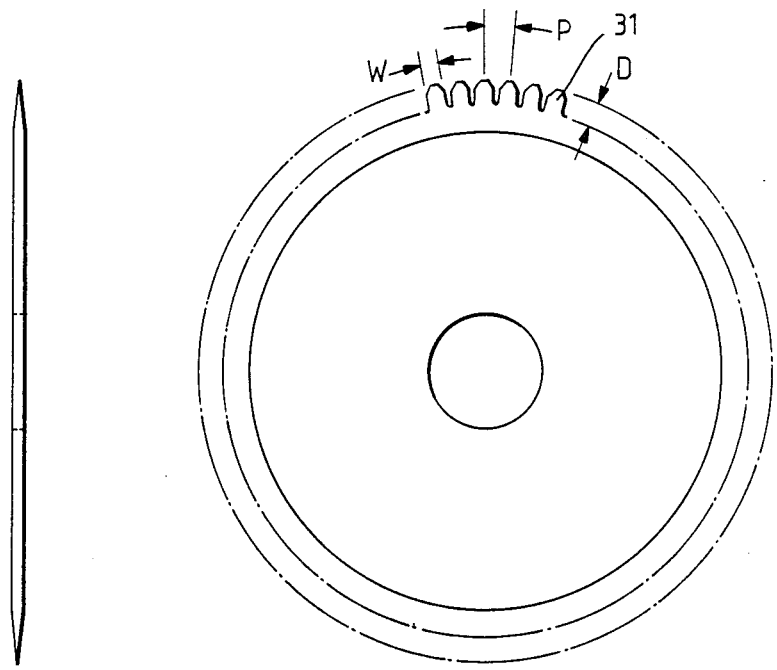

The invention will be described by way of example and with reference to the accompanying drawing in which:

FIG. 1 is a diagrammatic view of the cutting device according to this invention, FIG. 2 is an end view showing the plough means in situ on a mandrel, FIGS. 3A and B are end views showing the ply raised from the curved surface of the mandrel for automatic removal, FIGS. 4, 5 and 6 are detailed views of the plough means utilized in the cutting device of FIG. 1, and FIGS. 7 and 8 are detailed views of the serrated rotary cutter utilized in the cutting device of FIG. 1.

With reference to FIGS. 1 and 2 of the drawings, there is illustrated a cutting device 10 shown in situ over the curved surface of a mandrel for longitudinally slitting a textile material reinforced cylindrical ply formed on the mandrel, to produce a flat finished sheet of ply fabric reinforced by substantially parallel textile cords. Such a ply may be utilized in the manufacture of radial carcass tires for cars.

The ply slitting device consists of a driven serrated rotary knife 12 mounted on a carriage 13 which is movable along a guide means 14 parallel to the axis of the mandrel 11. The knife 12 is followed in the cutting stroke by a plough means 15 also supported on the carriage 13 and which is arranged to raise one of the cut edges 18 of the ply 17 as shown in FIG. 3. The plough means 15 is shown in detail in FIGS. 4, 5 and 6, and comprises a longitudinally extending body portion 21 (that is longitudinally with respect to the longitudinal axis of the mandrel) having at one end a tongue 22 for attachment to the carriage 13. The body portion 21 has a thin flat shape and is arranged to lie in a radial plane relative to the mandrel. At the other end of the body portion 21 there is an axially extending beak or nose 23. The beak 23, in use, projects underneath the ply and extends to a position upstream of the cutter 12 (that is upstream in relation to the direction of the movement of the cutting stroke). The extreme upstream portion 24 of the beak 23 is slightly raised and rounded to provide a good lift action for separating the ply 17 from the surface of the mandrel 11. The beak 23 lift the ply off the mandrel by about 0.5 mm so that the cutter can cut the cord without damage to the mandrel surface.

The axially upstream end face 25 of the plough body portion 21 is radiused and chamfered to provide a good separating surface for parting the cut edges 18 of the ply. On one side of the body portion 21 there is a delta shaped wing 26 with its 'v' shape pointing in the direction of the cutting stroke and that in use extends circumferentially around the mandrel. This wing 26 separates and lifts one of the cut edges 18 of the ply 17 from the mandrel surface. The plough means is preferably produced from stainless steel.

After the cutting stroke with the mandrel in the position shown in FIG. 3A, the mandrel 11 is then rotated through 90° to the position shown in FIG. 3B where the edge 18 of the cut ply 17 is presented to be gripped by a take off mechanism, this could include an automatic handling arm having clamp jaws which extend longitudinally of the mandrel to grip the ply along its length.

The serrated rotary knife 12 is shown in detail in FIGS. 7 and 8, and comprises a circular blade having fine pitched teeth 31 spaced around its outer periphery. The teeth 31 are pitched at about 5° of arc spacings 'P' and have a depth 'D' of about 5 mm and a typical circumferential width 'W' of about 3 mm. This configuration has been found particularly suitable for slitting of textile cord reinforced elastomeric plies for use in carcass plies of radial carcass car tires.

I claim:
1. A cutting device for slitting a textile material lying on a curved surface, the cutting device having
(a) a guide means and a carriage movable thereon, the carriage being movable along the guide means at a substantially fixed height from the curved surface along which the slit is to be made;
(b) a serrated rotary knife mounted on the carriage; and
(c) plough means, mounted on the carriage, for lifting the textile material off of the curved surface, for permitting the knife to cut the textile material without contacting such surface, and for raising one of the cut edges of the textile material off such curved surface.

2. A cutting device as claimed in claim 1 wherein the plough means is located downstream of the knife in relation to the direction of movement of the knife during a cutting stroke and it has a nose portion projecting upstream of the point of contact between the knife and textile material.

3. A cutting device as claimed in claim 2 wherein the plough means includes a longitudinally extending flat body portion arranged in a radial plane with respect to the curved surface.

4. A cutting device as claimed in claim 3 wherein the plough means includes a substantially delta shaped wing having its "V" pointing in the direction of the cutting stroke and which extends circumferentially around the curved surface to lift the cut edges of the textile material from the curved surface.

5. A cutting device as claimed in claim 4 wherein the delta shaped wing is arranged to extend from one longitudinal side of the body portion.

6. A cutting device as claimed in claim 1 wherein the rotary knife has fine pitched teeth spaced around its periphery by a pitch corresponding to a 5° arc, and the teeth have a depth of substantially 5 mm, and a width of about 3 mm.

7. A method of manufacturing a ply of textile reinforced elastomeric material in a shape suitable for use in a pneumatic tire, said method comprising:
  winding at least one layer of elastomeric material onto a cylindrical mandrel;
  rotating a rotary knife while moving said knife in an axial direction parallel to but not touching said mandrel so as to cut the elastomeric material thereon;
  moving a plough means simultaneously with said knife, said plough means being positioned downstream from said knife in relation to the direction of movement of the knife during a cutting stroke;
  lifting a cut edge of the material off the surface of the mandrel by means of the plough.

* * * * *